US012682685B2

(12) United States Patent
Yang et al.

(10) Patent No.: US 12,682,685 B2
(45) Date of Patent: Jul. 14, 2026

(54) LIVENESS DETECTION METHOD AND APPARATUS, AND TRAINING METHOD AND APPARATUS FOR LIVENESS DETECTION SYSTEM

(71) Applicant: MASHANG CONSUMER FINANCE CO., LTD., Chongqing (CN)

(72) Inventors: Jiezhi Yang, Chongqing (CN); Xunyi Zhou, Chongqing (CN); Dingheng Zeng, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 351 days.

(21) Appl. No.: 18/568,910

(22) PCT Filed: Aug. 3, 2022

(86) PCT No.: PCT/CN2022/110111
§ 371 (c)(1),
(2) Date: Dec. 11, 2023

(87) PCT Pub. No.: WO2023/098128
PCT Pub. Date: Jun. 8, 2023

(65) Prior Publication Data
US 2024/0282149 A1 Aug. 22, 2024

(30) Foreign Application Priority Data

Dec. 1, 2021 (CN) .......................... 202111454390.6

(51) Int. Cl.
*G06V 40/40* (2022.01)
*G06T 7/593* (2017.01)
(Continued)

(52) U.S. Cl.
CPC .............. *G06V 40/40* (2022.01); *G06T 7/593* (2017.01); *G06V 10/764* (2022.01);
(Continued)

(58) Field of Classification Search
CPC .... G06V 40/40; G06V 10/764; G06V 10/776; G06V 10/803; G06V 10/82;
(Continued)

(56) References Cited

U.S. PATENT DOCUMENTS 11,972,638 B2 * 4/2024 Zhang .................. G06V 10/454
2020/0082160 A1 * 3/2020 Li ............................ G06N 3/09
(Continued)

FOREIGN PATENT DOCUMENTS

CN 110765923 A 2/2020
EP 3995989 A1 5/2022
(Continued)

OTHER PUBLICATIONS

Rehman, Yasar Abbas Ur, Lai-Man Po, and Mengyang Liu. "SLNet: Stereo face liveness detection via dynamic disparity-maps and convolutional neural network." Expert Systems with Applications 142 (2020): 113002. (Year: 2020).*
(Continued)

*Primary Examiner* — Utpal D Shah
(74) *Attorney, Agent, or Firm* — Cooper Legal Group, LLC

(57) ABSTRACT

Disclosed in the present application are a liveness detection method and apparatus, a training method and apparatus for a liveness detection system, and an electronic device and a storage medium. The liveness detection method comprises: acquiring two target images, which are obtained by means of a first sensor and a second sensor respectively performing collection on the same face to be recognized; extracting target depth information from the two target images by using a deep generative network; and performing detection on the target depth information by using a liveness detection model, so as to obtain a liveness detection result of said face. The liveness detection model is obtained by means of
(Continued)

training using depth information of sample data, the sample data comprises first sample images, which are collected by the first sensor under at least two types of illumination, and second sample images, which are collected by the second sensor under the at least two types of illumination, and each of the first sample images and each of the second sample images comprise spoofing faces of different materials. Target depth information is extracted from two images by means of a deep generative network, and liveness detection is performed on the target depth information by using a liveness detection model, so as to recognize spoofing faces of different materials under different types of illumination, such that the accuracy of recognition is higher.

15 Claims, 17 Drawing Sheets

(51) Int. Cl.

| | | |
|---|---|---|
| *G06V 10/764* | (2022.01) | |
| *G06V 10/776* | (2022.01) | |
| *G06V 10/80* | (2022.01) | |
| *G06V 10/82* | (2022.01) | |
| *G06V 40/16* | (2022.01) | |

(52) U.S. Cl.
CPC .......... *G06V 10/776* (2022.01); *G06V 10/803* (2022.01); *G06V 10/82* (2022.01); *G06V 40/172* (2022.01); *G06T 2207/10012* (2013.01); *G06T 2207/10152* (2013.01); *G06T 2207/20081* (2013.01); *G06T 2207/20084* (2013.01); *G06T 2207/20221* (2013.01); *G06T 2207/30201* (2013.01)

(58) Field of Classification Search
CPC ...... G06V 40/172; G06V 40/45; G06V 20/64; G06V 40/16; G06T 7/593; G06T 2207/10012; G06T 2207/10152; G06T 2207/20081; G06T 2207/20084; G06T 2207/20221; G06T 2207/30201
See application file for complete search history.

(56) References Cited

U.S. PATENT DOCUMENTS

| | | | |
|---|---|---|---|
| 2021/0027081 A1 | 1/2021 | Zhang et al. | |
| 2021/0397863 A1* | 12/2021 | Kose Cihangir | ...... G06V 20/59 |
| 2022/0189110 A1* | 6/2022 | Tang | ...................... G06V 40/40 |
| 2023/0206700 A1* | 6/2023 | Khan | ................... G06V 40/165 |
| | | | 382/116 |

FOREIGN PATENT DOCUMENTS

| | | | | |
|---|---|---|---|---|
| WO | WO-2021219095 A1 * | 11/2021 | ............. | H04N 23/60 |
| WO | WO-2023124237 A1 * | 7/2023 | ............. | G06F 21/32 |

OTHER PUBLICATIONS

Supplementary European Search Report in the European application No. 22899948.8, mailed on Oct. 25, 2024, 11 pages.

* cited by examiner

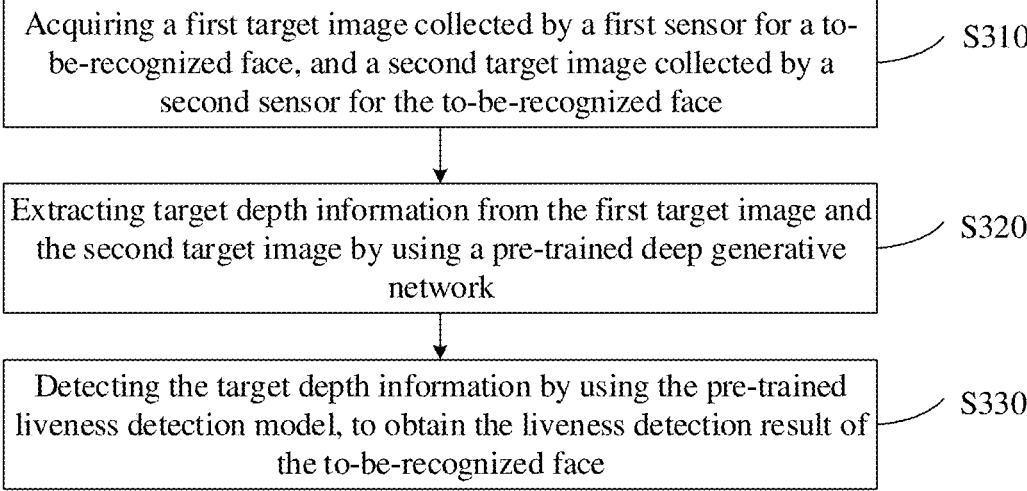

Acquiring a first target image collected by a first sensor for a to-be-recognized face, and a second target image collected by a second sensor for the to-be-recognized face —— S310

Extracting target depth information from the first target image and the second target image by using a pre-trained deep generative network —— S320

Detecting the target depth information by using the pre-trained liveness detection model, to obtain the liveness detection result of the to-be-recognized face —— S330

FIG. 3

Left: RGB

Right: RGB

NNB network

Target depth information

Input feature map                                        Output feature map

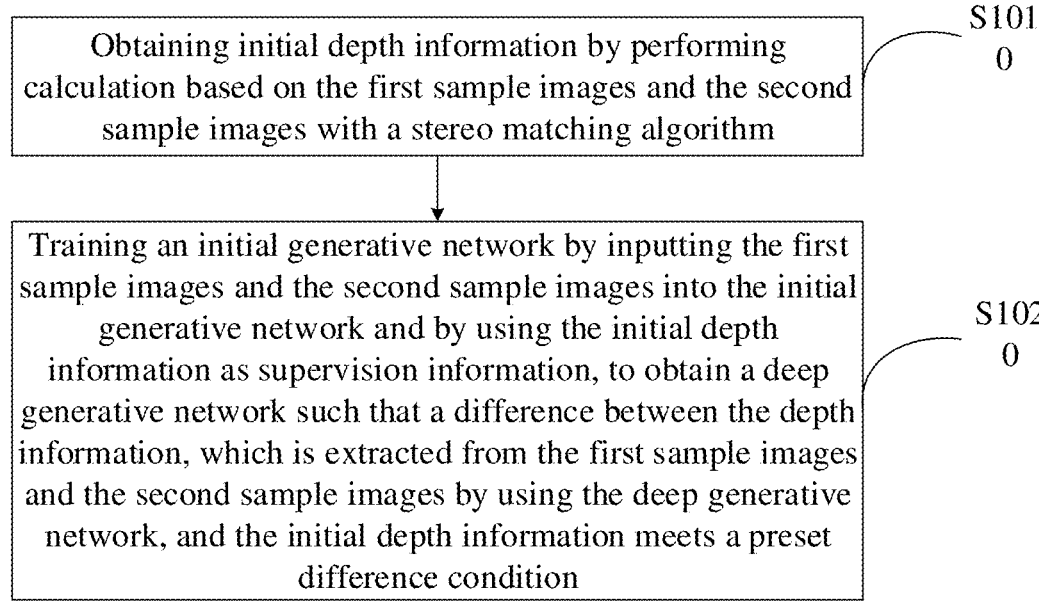

Obtaining initial depth information by performing calculation based on the first sample images and the second sample images with a stereo matching algorithm
    S1010

Training an initial generative network by inputting the first sample images and the second sample images into the initial generative network and by using the initial depth information as supervision information, to obtain a deep generative network such that a difference between the depth information, which is extracted from the first sample images and the second sample images by using the deep generative network, and the initial depth information meets a preset difference condition
    S1020

```
┌──────────────┐        ┌──────────────┐
│  Processor   │────────│   Memory     │
│    1610      │        │    1620      │
└──────────────┘        └──────────────┘
```

FIG. 16

Computer-readable storage medium1700     1710

Program codes

LIVENESS DETECTION METHOD AND APPARATUS, AND TRAINING METHOD AND APPARATUS FOR LIVENESS DETECTION SYSTEM

TECHNICAL FIELD

The present disclosure relates to the technical field of face liveness detection, and in particular, to a method and apparatus for liveness detection, and a training method and apparatus for a liveness detection system, and an electronic device and a storage medium.

BACKGROUND

With development of facial recognition technologies, a face liveness detection technology becomes a key step in the facial recognition technology. However, a detection result obtained by face liveness detection is not accurate enough, and there is a risk of recognizing a spoofing face as a live face.

SUMMARY

In view of the above problems, the present disclosure provides a method and apparatus for liveness detection, and an electronic device and a storage medium, which can solve the above problems.

According to a first aspect, an embodiment of the present disclosure provides a liveness detection method, which includes: acquiring a first target image which is collected by a first sensor for a to-be-recognized face, and acquiring a second target image which is collected by a second sensor for the to-be-recognized face; extracting target depth information from the first target image and the second target image by using a pre-trained deep generative network; and obtaining a liveness detection result of the to-be-recognized face by detecting the target depth information by using a pre-trained liveness detection model, wherein the liveness detection model is obtained by training using depth information extracted from sample data, the sample data includes first sample images collected by the first sensor, and second sample images collected by the second sensor in at least two lighting environments, and the first sample images and the second sample images all include spoofing faces of different materials.

According to a second aspect, an embodiment of the present disclosure provides a training method for a liveness detection system. The liveness detection system includes a deep generative network and a liveness detection model. The training method includes: acquiring first sample images collected by a first sensor for face samples, and second sample images collected by a second sensor for the face samples in at least two lighting environments, wherein the face samples include spoofing faces of different materials; training the initial generative network by inputting the first sample images and the second sample images into an initial generative network, to obtain the deep generative network; extracting depth information of the face samples from the first sample images and the second sample images by using the deep generative network; and training the neural network model by inputting the depth information of the face samples into a neural network model, to obtain the liveness detection model.

According to a third aspect, an embodiment of the present disclosure provides a liveness detection apparatus. The apparatus includes an image acquisition module, a depth generation module, and a liveness detection module. The image acquisition module is configured to acquire a first target image which is collected by a first sensor for a to-be-recognized face, and acquire a second target image which is collected by a second sensor for the to-be-recognized face. The depth generation module is configured to extract target depth information from the first target image and the second target image by using a pre-trained deep generative network. The liveness detection module is configured to detect the target depth information by using a pre-trained liveness detection model, to obtain a liveness detection result of the to-be-recognized face. Here, the liveness detection model is obtained by training using depth information extracted from sample data, the sample data includes first sample images collected by the first sensor, and second sample images collected by the second sensor in at least two lighting environments, and the first sample images and the second sample images all include spoofing faces of different materials.

According to a fourth aspect, an embodiment of the present disclosure provides a training apparatus for a liveness detection system. The liveness detection system includes a deep generative network and a liveness detection model. The training apparatus includes: a sample acquisition module, configured to acquire first sample images collected by a first sensor for face samples, and second sample images collected by a second sensor for the face samples in at least two lighting environments, wherein the face samples include spoofing faces of different materials; a network training module, configured to train the initial generative network by inputting the first sample images and the second sample images into an initial generative network, to obtain the deep generative network; a depth extraction module, configured to extract depth information of the face samples from the first sample images and the second sample images by using the deep generative network; and a model training module, configured to train the neural network model by inputting the depth information of the face samples into a neural network model, to obtain the liveness detection model.

According to a fifth aspect, an embodiment of the present disclosure provides an electronic device, which includes: one or more processors; a memory; and one or more application programs. The one or more programs are stored in the memory and configured to be executed by the one or more processors; and the one or more application programs are configured to execute the liveness detection method or the training method for a liveness detection system.

According to a sixth aspect, an embodiment of the present disclosure provides a computer-readable storage medium. The computer-readable storage medium stores program codes. The program codes are executable by a processor to perform the liveness detection method or the training method for a liveness detection system.

According to a seventh aspect, an embodiment of the present disclosure provides a computer program product including instructions. The computer program product stores instructions; and when the instructions are executed on a computer, the computer is enabled to implement the liveness detection method or the training method for a liveness detection system.

In the present disclosure, two target images collected by two sensors for the same to-be-recognized face may be acquired, and the target depth information (i.e., the depth information of the to-be-recognized face) is extracted based on the two target images by using a pre-trained deep generative network, and then detection is performed according to the target depth information by using the pre-trained liveness detection model, so as to obtain the liveness detection result of the to-be-recognized face. The liveness detection model is obtained by training based on the depth information extracted from sample data. The sample data includes first sample images collected by a first sensor, and second sample images collected by a second sensor, under at least two lighting environments. The first sample images include spoofing faces of different materials, and the second sample images include spoofing faces of different materials. That is to say, according to the technical solutions of the present disclosure, by using a neural network, according to two images of the same to-be-recognized face, the depth information of the to-be-recognized face can be rapidly acquired and the liveness detection result of the to-be-recognized face is determined according to the depth information, such that efficient and high-accurate liveness detection is achieved. In addition, according to the present disclosure, a spoofing face in different lighting environments may be recognized, such that the accuracy of liveness detection is higher.

These or other aspects of the present disclosure can be understood more concisely in the description of the following embodiments.

BRIEF DESCRIPTION OF THE DRAWINGS

In order to describe the technical solutions in embodiments of the present disclosure more clearly, the drawings required to be used in the embodiments will be simply introduced below. It is apparent that the drawings in the following descriptions are merely some embodiments of the present disclosure. A person skilled in the art may further obtain other drawings according to these drawings without creative work.

FIG. 3 is a flowchart of a liveness detection method according to an embodiment of the present disclosure.

FIG. 10 is a flowchart of a training process of a deep generative network in a liveness detection system according to an embodiment of the present disclosure.

FIG. 16 is a block diagram of a structure of an electronic device according to an embodiment of the present disclosure.

DETAILED DESCRIPTION

In order to enable those skilled in the art to better understand the solutions of the present disclosure, the technical solutions in the embodiments of the present disclosure will be clearly and completely described below in combination with the drawings in the embodiments of the present disclosure.

With the rapid development of the internet industry, an artificial intelligence technology taking machine learning and deep learning as iconic technologies is widely applied in the fields related to video images, speech recognition, and natural speech processing, and is more widely used especially in facial recognition. Facial recognition shows huge development potential under the driving of artificial intelligence and big data; and application scenarios of facial recognition continues to extend, and gradually lands from public fields of security to commercial fields of payment and verification. However, facial recognition is a double-edged sword, which brings information security problems of data leakage, infringement of personal privacy and impersonation of identity by others, while technologies continue to evolve and applications continue to spread. As facial recognition is widely applied, spoofing faces such as a 3D face model and a face mask gradually become prevalent, especially the emerging of an adversarial attack technology of facial recognition based on the spoofing faces, causing great impact on the accuracy of conventional face recognition systems, such that a detection result obtained through face liveness detection is relatively low in accuracy. There is a risk of recognizing a spoofing face as a live face, and the information security of users are unable to be ensured.

In order to solve the above problems, through careful study, the inventor of the present disclosure found that target depth information may be extracted, by using a pre-trained deep generative network, from two images respectively collected by two sensors, and then liveness detection is performed on the target depth information by using the pre-trained liveness detection model, such that a more accurate detection result may be obtained without increasing hardware costs.

In order to better understand a liveness detection method and apparatus, and a training method and apparatus for a liveness detection system, and an electronic device and a storage medium provided in the embodiments of the present disclosure, application environments suitable for the embodiments of the present disclosure are described below.

Figure 1:
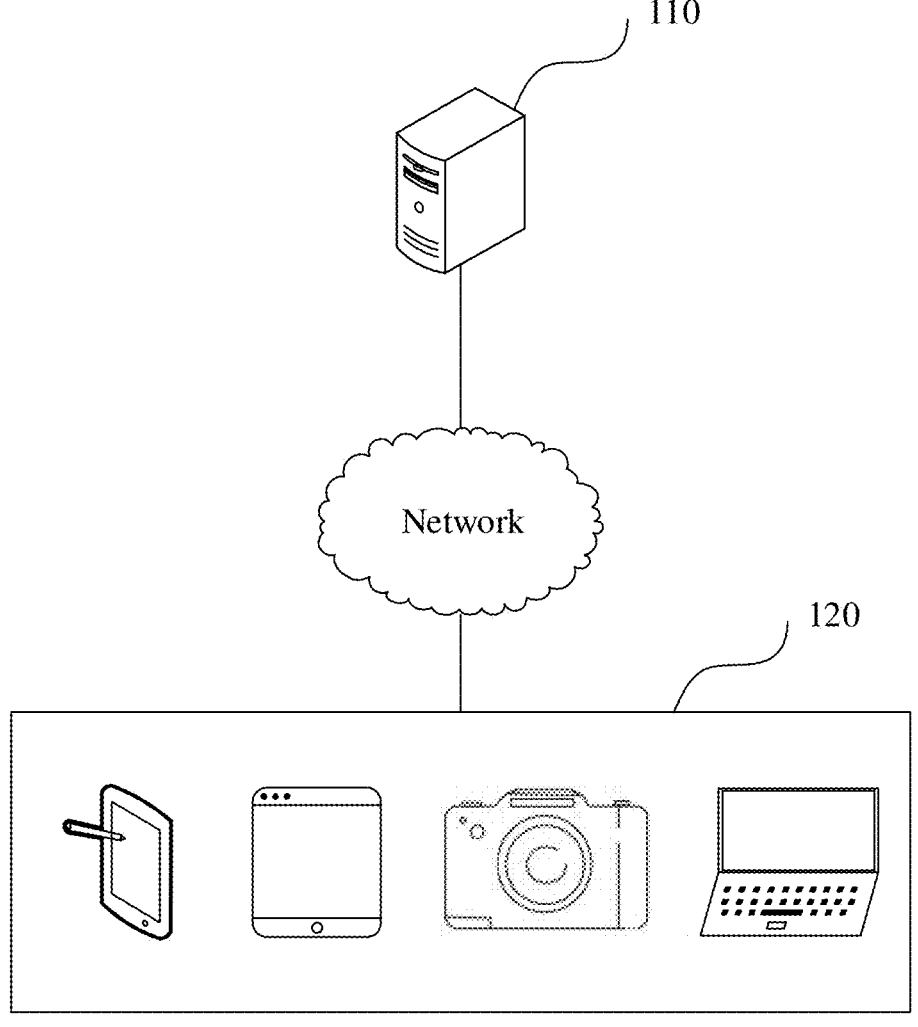
FIG. 1 is a schematic diagram of an application environment of a liveness detection method according to an embodiment of the present disclosure.

Referring to FIG. 1, FIG. 1 is a schematic diagram of an application environment of a liveness detection method according to an embodiment of the present disclosure. Exemplarily, the liveness detection method and the training method for a liveness detection system provided in the embodiments of the present disclosure may be applied to an electronic device. Optionally, the electronic device may be, for example, a server 110 shown in FIG. 1. The server 110 may be connected to an image acquisition device 120 via a network. The network is a medium that is configured to provide a communication link between the server 110 and the image acquisition device 120. The network may include various connection types of networks, such as wired communication links and wireless communication links, and the embodiments of the present disclosure is not limited thereto.

In some embodiments, the image acquisition device 120 may include a first sensor and a second sensor. During facial recognition, face images of users may be respectively collected by using the first sensor and the second sensor; and then the collected face images may be sent to the server 110 via the network. After the server receives these face images, liveness detection may be performed on the users according to these face images by using the liveness detection method described in the embodiment of the present disclosure. Exemplarily, these face images may include a first target image, which is collected by the first sensor for a user, and a second target image, which is collected by the second sensor for the user.

It is to be understood that, the server 110, the network and the image acquisition device 120 shown in FIG. 1 are merely exemplary. According to an implementation requirement, the server 110, the network and the image acquisition device may be in any quantity. Exemplarily, the server 110 may be a physical server, or may be a server cluster consisting of a plurality of servers. The image acquisition device 120 may be a device such as a mobile phone, a tablet, a camera, and a notebook computer. It can be understood that in the embodiment of the present disclosure, a plurality of image acquisition devices 120 may also be allowed to access to the server 110 at the same time.

Figure 2:
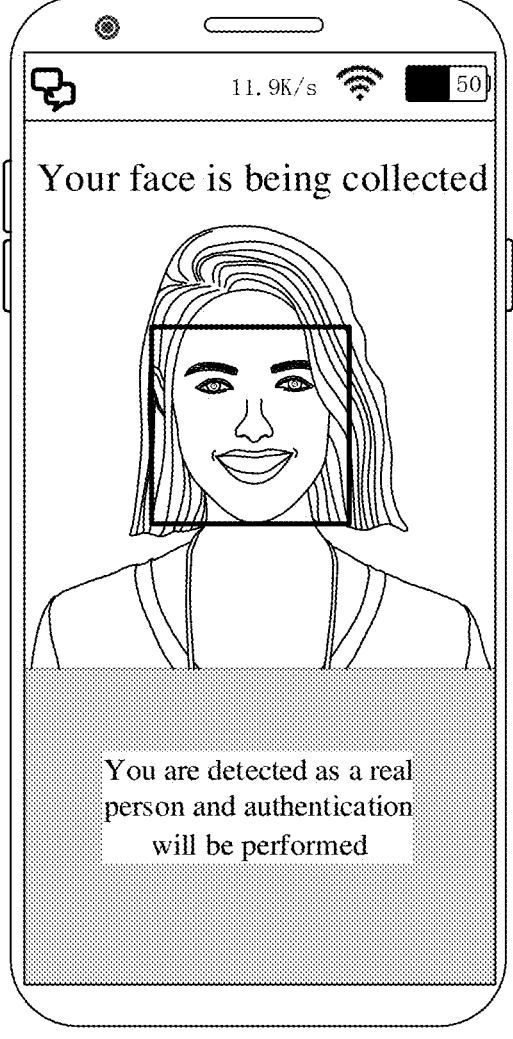
FIG. 2 is a schematic diagram of an application scenario of a liveness detection method according to an embodiment of the present disclosure.

Optionally, in some other embodiments, as shown in FIG. 2, the electronic device may also be a smart phone, a tablet, a notebook computer, or the like. In some implementations, the image acquisition device 120 may be integrated in the electronic device. For example, the electronic device such as the smart phone, the tablet, and the notebook computer may be equipped two sensors. During facial recognition, the electronic device may use the two sensors to collect the face images of the users, and then locally perform liveness detection according to the collected face images. Optionally, if it is detected, according to the collected face images, that the users are alive, liveness detection is passed. In this case, further identity verification may be continuously performed on the users, and the collected face images and the detection result of liveness detection may also be synchronously displayed on a display interface of the electronic device.

The above application environment is only an example for better understanding. It can be understood that the embodiment of the present disclosure is not limited to the above application environment.

The liveness detection method and apparatus, and the training method and apparatus for a liveness detection system, and the electronic device and the storage medium provided in the present disclosure are described below in detail by using the specific embodiments.

FIG. 3 is a flowchart of a liveness detection method according to an embodiment of the present disclosure. As shown in FIG. 3, the liveness detection method may specifically include the following step.

At S310, a first target image which is collected by a first sensor for a to-be-recognized face is acquired, and a second target image which is collected by a second sensor for the face is acquired.

Under an application scenario of security and face payments, a face image of a user is generally collected in real time, then the face image is recognized, and the identity of the user is verified according to face features in the face image. Generally, in order to the security of user information, before identity verification, whether the user in the current face image is a real person needs to be determined through face liveness detection, so as to prevent others from illegally using the identity of the user by using pictures and face masks.

In face liveness detection, by detecting the face image, it may be recognized whether the face image is obtained by performing collection on a real person (a corresponding detection result being live) or whether the face image is obtained by performing collection on a spoofing face (the corresponding detection result being spoofing). When the detection result is a living body, liveness detection may be passed, and other processing flows will be performed, for example, identity verification may be performed on the user.

It can be understood that the to-be-recognized face in liveness detection may be a recognition object during facial recognition, such as a face that receives recognition when approaching the image acquisition device under the disclosure scenario of security and face payments. The recognition object may be the face of a real user, or may be a spoofing face forged. In some embodiments, the spoofing face may be a face picture, a face mask, or a printed paper face. Alternatively, the spoofing face may be a virtual face, such as a virtual image which is generated based on a real face.

Figure 4:
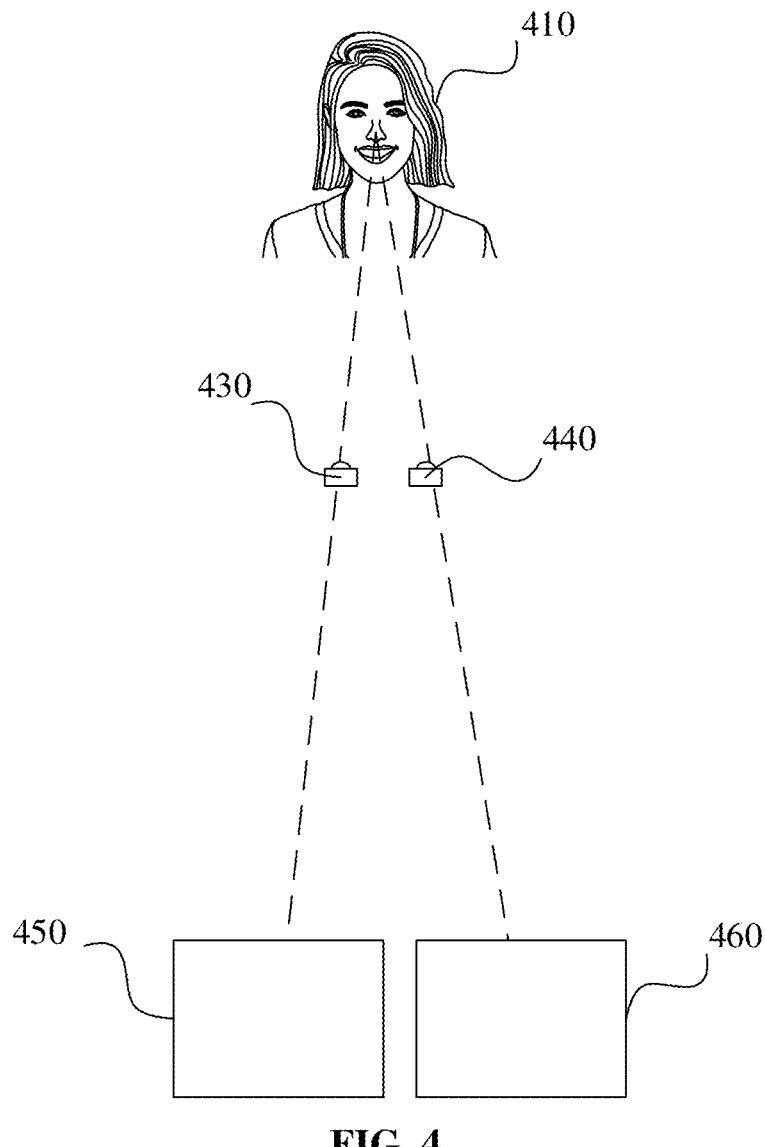
FIG. 4 is a schematic diagram of imaging by a first sensor and a second sensor according to an embodiment of the present disclosure.

In an embodiment of the present disclosure, the face images of the to-be-recognized face may be collected by using the first sensor and the second sensor. As shown in FIG. 4, the first sensor 430 and the second sensor 440 may be spaced from each other by a close distance. By performing image acquisition on the to-be-recognized face 410 using the first sensor 430 and the second sensor 440, the first target image 450 collected by the first sensor 430 and the second target image 460 collected by the second sensor 440 may be obtained. That is to say, the first target image 450 and the second target image 460 are face images that are obtained by performing collection on the same to-be-recognized face at different positions. Preferably, in order to conveniently process the first target image and the second target image during the subsequent liveness detection, the first target image and the second target image may have the same image size.

In particular, in order to obtain more standard and reliable face images for the to-be-recognized face, the first sensor 430 and the second sensor 440 may be arranged in front of the to-be-recognized face during image acquisition. For example, the first sensor and the second sensor both are located at the same horizontal height with the central point of two eyes of the to-be-recognized face. Optionally, the distance from the first sensor and the second sensor to the to-be-recognized face may be determined by using the difference (optical parallax) between the first target image 450 and the second target image 460, which are respectively collected by the first sensor 430 and the second sensor 440. For example, the distance between the first sensor and the central point of the two eyes of the to-be-recognized face, and the distance between the second sensor and the central point of the two eyes of the to-be-recognized face may be determined.

By performing image acquisition on the same to-be-recognized face respectively using the first sensor and the second sensor, the obtained first target image and second target image may both include the face images of the to-be-recognized face. In addition, compared with a single sensor, more detailed image information may be obtained for the to-be-recognized face by using two sensors to respectively perform image acquisition, and then a more accurate detection result may be obtained by using the image information during liveness detection. For example, the image information may be texture information or lighting information having higher accuracy; and spoofing faces such as face masks made of special materials can be detected by using the texture information or the lighting information.

In some implementations, after the first sensor and the second sensor respectively collect the first target image and second target image including the to-be-recognized face, these images may be transmitted into the electronic device for liveness detection.

Optionally, the first sensor and the second sensor may both be visible light cameras, such that the first target image and the second target image may be visible light images, which may be RGB images or grayscale images.

It can be understood that in some typical embodiments, the first sensor and the second sensor may be separated by a close distance, for example, 1 decimeter. Optionally, the distance between the first sensor and the to-be-recognized face may be the same as the distance between the second sensor and the to-be-recognized face. Optionally, a photographing angle of the first sensor for the to-be-recognized face may also be the same as a photographing angle of the second sensor for the to-be-recognized face.

Optionally, the first sensor and the second sensor may be arranged on the same binocular stereo vision sensor. For example, the first sensor may be a left-eye sensor of the binocular stereo vision sensor; and the second sensor may be a right-eye sensor of the binocular stereo vision sensor.

At S320, target depth information is extracted from the first target image and the second target image by using a pre-trained deep generative network.

In some implementations, distance information between the two sensors and the to-be-recognized face may be determined by using the difference (optical parallax) between the first target image and the second target image, which are respectively collected by the first sensor and the second sensor, and then the distance information may be used as depth information of the to-be-recognized face. Exemplarily, the depth information of the to-be-recognized face may be calculated according to a stereo matching algorithm. However, more resources and time are consumed by using the stereo matching algorithm to calculate the depth information, resulting in reduction in detection efficiency, such that the method is unable to be applied to application scenarios that require frequent liveness detection.

Figure 5:
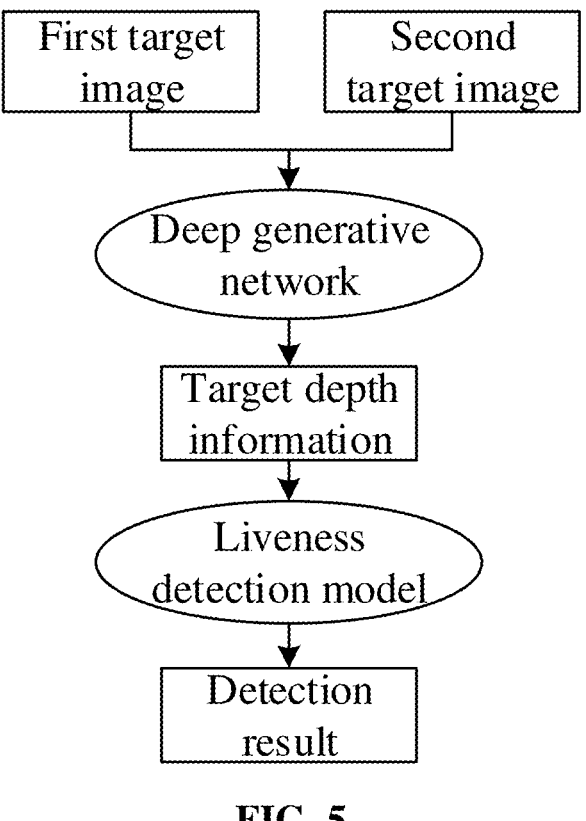
FIG. 5 is a schematic diagram of a processing process of a liveness detection system according to an embodiment of the present disclosure.

As shown in FIG. 5, in the embodiment of the present disclosure, the target depth information may be extracted from the first target image and the second target image by using the pre-trained deep generative network. The target depth information may also represent the distance information between the first sensor and the second sensor and the to-be-recognized face. Optionally, the deep generative network may use a lightweight generator, of which algorithm complexity is lower than algorithm complexity of the stereo matching algorithm, such that the depth information may be obtained by less resources, thereby improving the efficiency of liveness detection.

Whether the to-be-recognized face is live or spoofing may be distinguished by using the target depth information extracted from the first target image and the second target image to perform liveness detection on the to-be-recognized face. It can be understood that the face image of a real person and the face image of a spoofing face show different features on the target depth information. Herein, a depth feature corresponding to a live face of the real person may be determined as a living body feature, and a depth feature corresponding to the spoofing face is determined as a spoofing feature. A liveness detection result of the to-be-recognized face may be obtained by comparing the target depth information with the living feature and/or the spoofing feature.

At S330, the target depth information is detected by using the pre-trained liveness detection model, so as to obtain the liveness detection result of the to-be-recognized face.

The liveness detection model is obtained by training using the depth information extracted from the sample data, the sample data includes the first sample images collected by the first sensor, and the second sample images collected by the second sensor, under the at least two lighting environments, and the first sample images and the second sample images all include spoofing faces of different materials.

In an embodiment of the present disclosure, the target depth information that is obtained in the foregoing steps and corresponds to the to-be-recognized face is inputted into the pre-trained liveness detection model, so as to perform liveness detection on the to-be-recognized face. Referring to FIG. 5, the liveness detection model may then output the detection result of the to-be-recognized face based on the target depth information. It can be understood that the detection result of liveness detection performed on the to-be-recognized face may be either live or spoofing. If the detection result is the living body, it may indicate that the liveness detection model confirms that the to-be-recognized face is the face of the real person; and if the detection result is spoofing, it may indicate that the liveness detection model confirms that the to-be-recognized face may not be the face of the real person, but may be a disguised spoofing face.

Optionally, the liveness detection model may be obtained by training using the depth information extracted from sample data. The sample data may be obtained by jointly performing image acquisition on a face sample by the first sensor and the second sensor in different lighting environments. That is to say, the sample data may include first sample images, which are collected by the first sensor for face samples, and second sample images, which are collected by the second sensor for the face samples in at least two lighting environments.

It is to be noted that, different lighting environments may include lighting environments such as strong light, weak light and sidelight, or may include various lighting environments with different color temperatures. Therefore, image acquisition is performed on the face samples by the first sensor and the second sensor in different lighting environments, such that a plurality of groups of sample data corresponding to a plurality of lighting environments may be obtained. Each group of sample data includes the first sample images and the second sample images.

For example, two groups of sample data may be obtained by respectively performing collection on the same face sample under strong light and weak light environments. One of the groups of sample data corresponds to the strong light environment, and the other group of sample data corresponds to the weak light environment. In this way, the liveness detection model is trained by using the sample data, which is obtained by performing image acquisition on the face samples in different lighting environments, such that the liveness detection model may be suitable for liveness detection requirements in various lighting environments, and accurate liveness detection results may be obtained under different lighting conditions.

Optionally, in order to enable the liveness detection model to be able to recognize a spoofing face, the first sample images and the second sample images used during training may include spoofing faces of different materials. That is to say, the face in the first sample images and the second sample images may include the spoofing faces of different materials. For example, the face in the first sample images and the second sample images may be various spoofing faces such as paper pictures, paper face masks, plastic face masks or head covering made of resin, such that the sample data may include face images, which are obtained by performing collection on the various spoofing faces such as paper pictures, paper face masks, plastic face masks or head covering made of resin by the first sensor and the second sensor.

It can be understood that in order to enable the liveness detection model to recognize face images of a real user, the first sample images and the second sample images used during training may also include the face images of the real user.

In some implementations, the liveness detection model may compare the target depth information with the living body feature corresponding to the real person and/or the spoofing feature corresponding to the spoofing face, so as to obtain the detection result of the to-be-recognized face. Exemplarily, due to the presence of the five sense organs and skin texture, the face of the real person is three-dimensional, such that the target depth information extracted from the face images of the real person is diverse. As the spoofing face is generally smooth, the target depth information extracted from the face images of the spoofing face is generally relatively single. Therefore, if the target depth information extracted from the first target image and the second target image of the to-be-recognized face is relatively diverse, the to-be-recognized face may be determined as a living body (i.e., a real face).

In some other implementations, the liveness detection model may score the to-be-recognized face based on the target depth information. A liveness detection score may be calculated in the liveness detection model based on the target depth information. When the liveness detection score meets a preset detection threshold, it may be determined that the to-be-recognized face is live; and when the liveness detection score meets a preset spoofing threshold, it may be determined that the to-be-recognized face is spoofing.

Specifically, in order to determine whether the to-be-recognized face is the face of a real user, a target detection score of the to-be-recognized face may be calculated based on the target depth information; then the target detection score is compared with the preset detection threshold, so as to determine whether the target detection score meets a preset condition; and if the target detection score meets the preset condition, the to-be-recognized face is determined to be live.

In some embodiments, the liveness detection model may compare the target depth information with a depth feature (i.e., the living body feature) corresponding to the living body, and obtain the target detection score by calculating the similarity between the target depth information and the living body feature. For example, if the similarity between the target depth information and the living body feature is higher, the target detection score is higher; and if the similarity between the target depth information and the living body feature is lower, the target detection score is lower. Further, the target detection score may be the probability that the liveness detection model determines the to-be-recognized face as the living body. For example, the similarity between the target depth information and the living body feature is normalized by using a softmax model, so as to obtain the probability.

The preset detection threshold may be a detection threshold that detects the to-be-recognized face to be live. Herein, the preset detection threshold may be preset, or the preset detection threshold may also be determined during the training of the liveness detection model. Exemplarily, if the target detection score obtained by the liveness detection model is higher, it indicates that the to-be-recognized face is closer to the face of a real person. Therefore, as an example, when the target detection score is greater than the preset detection threshold, it may be determined that the to-be-recognized face is live. As another example, when the target detection score is less than the preset detection threshold, it may be determined that the to-be-recognized face is spoofing.

Optionally, in some scenarios, in order to determine whether the to-be-recognized face is spoofing, a target spoofing score of the to-be-recognized face may be calculated based on the target depth information; then the target spoofing score is compared with the preset spoofing threshold, so as to determine whether the target spoofing score meets a preset condition; and if the target spoofing score meets the preset condition, the to-be-recognized face is determined to be spoofing. It can be understood that the target spoofing score may be obtained by calculating the similarity between the target depth information and a depth feature (i.e., the spoofing feature) corresponding to a spoofing face. Further, the target spoofing score may be the probability that the liveness detection model determines the to-be-recognized face to be spoofing.

The preset spoofing threshold may be a detection threshold that detects the to-be-recognized face to be spoofing. Herein, the preset spoofing threshold may be preset, or the preset spoofing threshold may also be determined during the training of the liveness detection model.

As an example, if the target spoofing score obtained by the liveness detection model is higher, it indicates that the to-be-recognized face is closer to the spoofing face. Therefore, when the target spoofing score is greater than the preset spoofing threshold, it may be determined that the to-be-recognized face is spoofing.

To sum up, according to the liveness detection method provided in the present disclosure, the first target image, which is obtained by performing collection on the to-be-recognized face by the first sensor, and the second target image, which is obtained by performing collection on the same the to-be-recognized face by the second sensor, may be acquired; the target depth information is extracted from the first target image and the second target image by using the pre-trained deep generative network; and then the target depth information is detected by using the pre-trained liveness detection model, so as to obtain the liveness detection result of the to-be-recognized face. Optionally, the liveness detection model is obtained by training using the depth information extracted by the sample data. Based on this, according to the liveness detection method provided in the present disclosure, the target depth information is extracted, by using the deep generative network, from the two images collected by the first sensor and the second sensor, and then the target depth information is detected by using the liveness detection model, so as to obtain the liveness detection result, such that consumption of calculation resources may be greatly reduced, calculation time is shortened, detection efficiency is effectively improved, and real-time liveness detection is significantly improved. Therefore, the method is particularly suitable for actual liveness detection scenarios.

In addition, the sample data used in the liveness detection method provided in the present disclosure includes the first sample images collected by the first sensor, and the second sample images collected by the second sensor, under the at least two lighting environments, and the first sample images and the second sample images all include the spoofing faces of different materials, such that, by using the liveness detection method provided in the present disclosure, the spoofing faces of different materials can be recognized in different lighting environments, thereby achieving higher accuracy of liveness detection.

In some implementations, optionally, based on the above embodiments, the embodiment provides the liveness detection method. The first target image and the second target image may be fused, so as to obtain a target fusion image; and then the target fusion image is inputted into the deep generative network, and the target fusion image is processed in the deep generative network, so as to obtained the target depth information. In this way, the target depth information extracted by the deep generative network may reflect true features of the to-be-recognized face more accurately.

Figure 6:
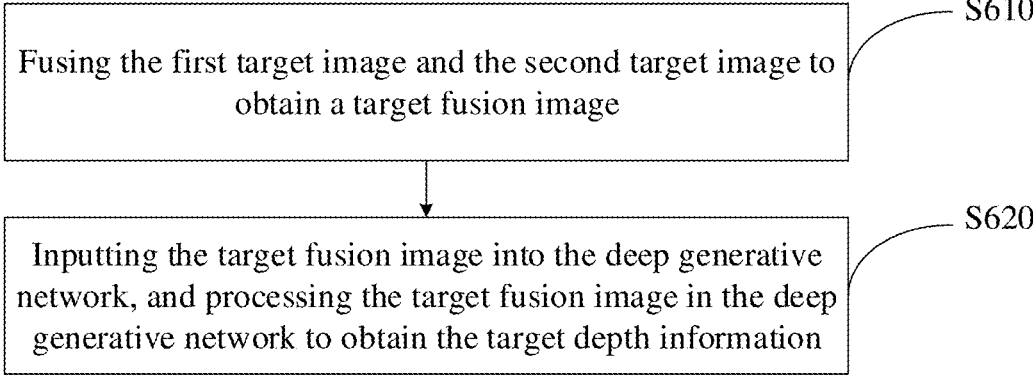
FIG. 6 is a flowchart of a liveness detection method according to another embodiment of the present disclosure.

FIG. 6 is a flowchart of a liveness detection method according to another embodiment of the present disclosure. The method may specifically include the following steps.

At S610, the first target image and the second target image are scaled down in equal proportion, and then are fused, so as to obtain the target fusion image.

If the target depth information is directly generated by the first target image and the second target image by using the deep generative network, the size of the target depth information may be larger, resulting in distortion of the target depth information, such that the true features of the to-be-recognized face cannot be accurately reflected. Therefore, in the embodiment of the present disclosure, the first target image and the second target image may be scaled down in equal proportion, and then are fused, so as to obtain the target fusion image; and then the target fusion image is inputted into the deep generative network.

Figure 7:
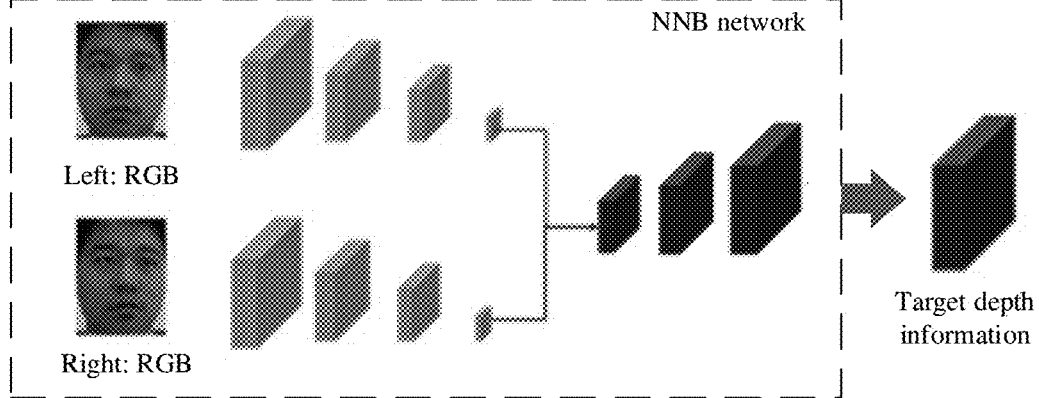
FIG. 7 is a schematic diagram of an extraction process of target depth information according to an embodiment of the present disclosure.

As an example, referring to FIG. 7, the first target image and the second target image may be scaled down in equal proportion by using downsampling, and then image fusion is performed on the two scaled-down image, so as to obtain the target fusion image.

Exemplarily, the first target image and the second target image may have the same image size. For example, the resolution of the two images is 112×112×3. Two feature maps may be generated by performing downsampling on the first target image and the second target image, and then the two feature maps are fused, such that the target fusion image with the resolution being 28×28×48 may be obtained, for example.

Optionally, the first target image XL and the second target image XR may be inputted into an F-CDCN network shallow feature extractor including FeatherNet and a center difference convolution module for processing, so as to obtain two feature maps g(XL) and g(XR) generated after downsampling; and then image fusion is performed on the two feature maps g(XL) and g(XR) by using feature stacking, so as to obtain the target fusion image. Herein, the target fusion image may be represented as Z=f([$g^L$(XL, $\theta^L$), $g^L$(XR, $\theta^R$)]; $\theta^F$), where f(·) represents a process of feature stacking.

Figure 8:
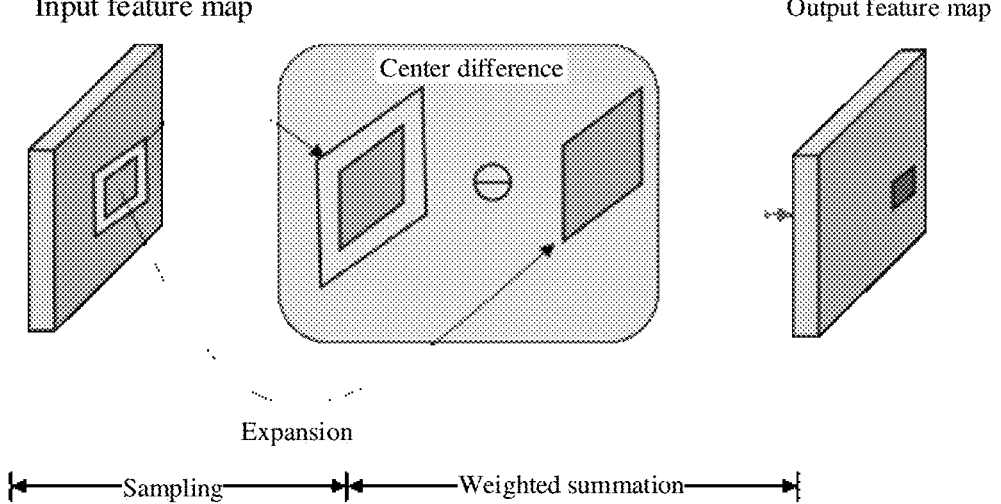
FIG. 8 is a schematic diagram of a processing process of center convolution according to an embodiment of the present disclosure.

In an F-CDCN, the skeleton of the network is built by using the structure of a lightweight network FeatherNetV2, and all convolutions in the network are replaced by using center difference convolution. The processing mode of the center difference convolution may be shown in FIG. 8.

In some typical embodiments, the center difference convolution may be represented as:

$$y(p0) = \theta \cdot \sum_{Pn \in R} w(Pn) \cdot (x(P0 + Pn) - x(P0))) +$$

$$(1 - \theta) \cdot \sum_{Pn \in R} w(Pn) \cdot x(P0 + Pn))$$

Here, y(·) is an output feature map; x(·) is an input feature map; P0 represents current positions of the input feature map and the output feature map; Pn represents the position of a local receptive field R; $\theta$ is a hyper-parameter of $\theta \in [0,1]$, which may be configured to measure the weight of different semantic information.

During liveness detection, feature extraction is performed on an image by using the center difference convolution, such that richer semantic information is able to be extracted from a face image, so as to cause the detection result of liveness detection to be more accurate.

At S620, the target fusion image is inputted into the deep generative network, and the target fusion image is processed in the deep generative network, so as to obtain the target depth information.

Specifically, the target fusion image may be inputted into the deep generative network, so as to generate the target depth information. Further, the deep generative network may be a pre-trained lightweight generator. Optionally, the algorithm complexity of the deep generative network may be less than the algorithm complexity of the stereo matching algorithm. In the lightweight generator G(·), bilinear upsampling may be performed on the target fusion image, and then the target depth information is finally generated through the processing of a Sigmoid activation function. The target depth information may be represented as $\hat{B}$=G(Z). Optionally, the generated target depth information may be shown in the form of a pseudo depth map, and the resolution of the pseudo depth map may be 56×56×1.

Further referring to FIG. 7, the processes of scaling down the first target image and the second target image in equal proportion, performing fusion, and using the deep generative network to obtain the target depth information may be unified in an NNB network for processing. That is to say, in the embodiment of the present disclosure, the target depth information may be obtained by directly inputting the first target image and the second target image into the NNB network. Such a modular processing mode may enable an image processing flow in liveness detection to be more concise.

It can be understood that the first target image and the second target image are scaled down in equal proportion, and fusion is then performed to obtain the target fusion image; and then the target fusion image is inputted into the deep generative network, and the target fusion image is processed in the deep generative network, so as to obtain the target depth information. In this way, the target depth information, which is obtained by processing, by using the deep generative network, the two images collected by the first sensor and the second sensor may reflect the true features of the to-be-recognized face more accurately, such that the detection result of liveness detection may be truer and more reliable.

In some implementations of the present disclosure, optionally, based on the above embodiments, before the target depth information is detected by using the pre-trained liveness detection model, so as to obtain the liveness detection result of the to-be-recognized face, the deep generative network and the liveness detection model may be trained by using the sample data collected in at least two lighting environments.

Figure 9:
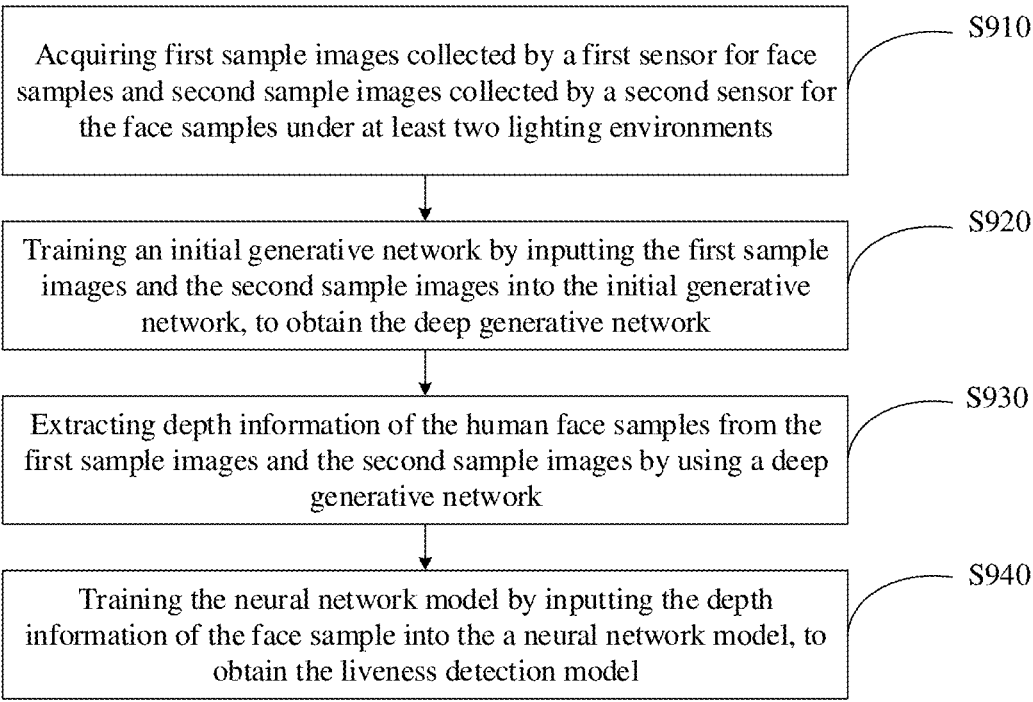
FIG. 9 is a flowchart of a training method for a liveness detection system according to an embodiment of the present disclosure.

FIG. 9 is a flowchart of a training method for a liveness detection system according to an embodiment of the present disclosure. Herein, the liveness detection system may include the deep generative network and the liveness detection model. Specifically, the training method may include the following steps.

At S910, first sample images collected by a first sensor for face samples and second sample images collected by a second sensor for the face samples in at least two lighting environments are acquired.

The face samples include spoofing faces of different materials.

Before training processes of a deep generative network and a liveness detection model are executed, sample data for training may be pre-collected. In the embodiment of the present disclosure, the first sensor and the second sensor may be used to perform collection on the same face sample in different lighting environments, such that the first sample images, which are obtained by performing collection on the face sample by the first sensor, and the second sample images, which are obtained by performing collection on the face sample by the second sensor, are obtained as the sample data for training. Optionally, different lighting environments may include two or more than two lighting environments such as strong light, weak light and sidelight, or may include various lighting environments with different color temperatures, and the embodiment of the present disclosure is not limited thereto.

Optionally, the sample data may include a plurality of first sample images and a plurality of second sample images, which are obtained by performing image acquisition on the face sample by the first sensor and the second sensor in different lighting environments. Exemplarily, for the face sample x1, image acquisition may be performed on the face sample x1 respectively in at least two lighting environments such as the strong light, the weak light and the sidelight, so as to obtain a plurality of groups of sample data; and each group of sample data of the face sample x1 may correspond to one lighting environment. For example, first sample data corresponding to the strong light environment, second sample data corresponding to the weak light environment, and third sample data corresponding to the sidelight environment may be obtained for the face sample x1 through collection. The first sample data may include the first sample images $$x_L^1,$$

which are obtained by performing collection on the face sample x1 under the strong light, and the second sample images $$x_R^1$$

of the face sample x1; the second sample data may include the first sample images $$x_L^2,$$

which are obtained by performing collection on the face sample x1 under the weak light, and the second sample images $$x_R^2;$$

and so on, other at least one group of sample data such as the third sample data may also be obtained.

Optionally, the sample data may include images of a plurality of face samples. In addition, the face samples may include the spoofing faces of different materials, and may further include faces of a plurality of real users.

Therefore, the sample data may be more diversified, and the trained liveness detection model may detect various faces in different lighting environments.

At S920, the first sample images and the second sample images are inputted into an initial generative network to train the initial generative network, so as to obtain the deep generative network.

In some implementations, the pre-built initial generative network may be trained by using the first sample images and the second sample images, so as to obtain the deep generative network.

Optionally, in some embodiments, the first sample images and the second sample images may be scaled down in equal proportion, and then are fused, so as to obtain sample fusion images; and then the sample fusion images are inputted into the initial generative network, so as to obtain the deep generative network. Similar to the process of obtaining the target fusion image in the foregoing embodiment, the first sample images and the second sample images may be simultaneously scaled down in equal proportion by downsampling, and then image fusion is performed on the two scaled-down image, so as to obtain the sample fusion images. Optionally, the first sample images and the second sample images may be inputted into an image processing unit including FeatherNet and a center difference convolution module for processing, so as to obtain two feature maps generated after downsampling. Specific processes of scaling down in equal proportion and fusion may refer to corresponding content in the foregoing embodiment, and the embodiment of the present disclosure is not described herein again.

In some implementations, as shown in FIG. 10, a specific training process of inputting the first sample images and the second sample images into the initial generative network to train the initial generative network, so as to obtain the deep generative network may include the following steps.

At S1010, calculation is performed by using a stereo matching algorithm based on the first sample images and the second sample images, so as to obtain initial depth information.

In a model training process of the embodiment of the present disclosure, the initial depth information calculated by the stereo matching algorithm may be used as supervised learning information to train the deep generative network.

In some implementations, the distance between the first sensor and the face sample may be the same as the distance between the second sensor and the face sample. Optionally, a photographing angle between the first sensor and the face sample may also be the same as a photographing angle between the second sensor and the face sample. Therefore, in the stereo matching algorithm, the initial depth information of the face sample may be obtained by calculating intrinsic parameters of the first sensor and the second sensor and optical parallax between the first sensor and the second sensor. The initial depth information may represent the linear distance between the first sensor and the second sensor and the face sample. For example, the initial depth information may include distance information between a baseline midpoint of the first sensor and the second sensor and each spatial point on the face sample.

Figure 11:
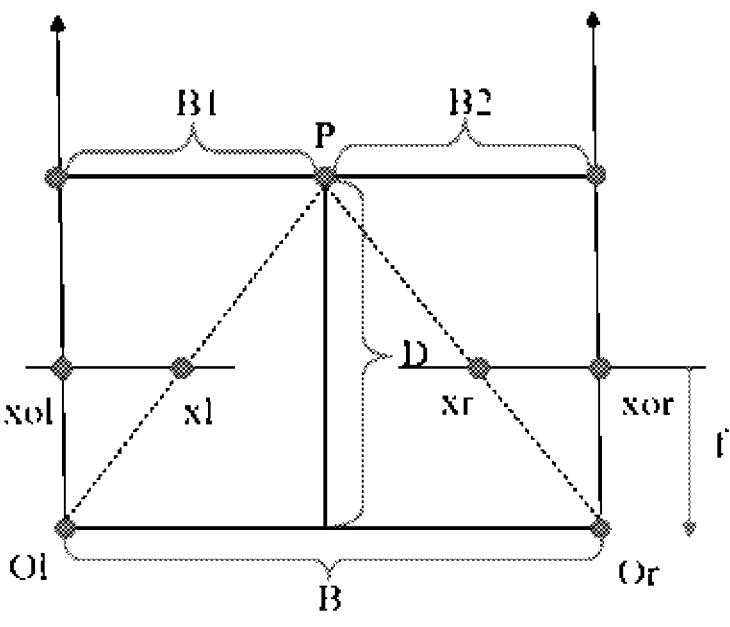
FIG. 11 is a schematic diagram of a stereo matching algorithm according to an embodiment of the present disclosure.

As shown in FIG. 11, Ol is the first sensor; Or is the first sensor; B is a baseline; f is a focal length; P is the position (for example, which may be one spatial point on the face sample) where a face sample to be measured is located, and P may be called as a target point; D is the linear distance between the target point P and the first sensor and the second sensor (for example, which may be the midpoint of the baseline between the two sensors); xl and xr are positions of the target point P shown on two image planes; xol and xor are respectively intersection points between an optical axis of the first sensor and the second sensor and the two image planes; and xol and xor may be called image principal points. If the baselines of the first sensor and the second sensor are unified, the following may be obtained by a similarity triangle principle:

$$\frac{f}{D} = \frac{xl - xol}{B1} = \frac{xor - xr}{B2}$$

The following may be concluded from the above equation:

$$\frac{f}{D} = \frac{xl - xol + xor - xr}{B1 + B2}$$

Baseline B=B1+B2, and a difference value between two pixel points on the two image planes on an X axis is the optical parallax, allowing the optical parallax to be d=xl−xr, the following is shown:

$$\frac{f}{D} = \frac{d + (xor - xol)}{B}$$

The initial depth information may be obtained:

$$D = \frac{B \times f}{d + (xor - xol)}.$$

In some typical embodiments, each group of sample data (including the first sample images and the second sample images) and the corresponding initial depth information may be combined into one copy of training data. Further, all training data may be jointly combined into a training set. The deep generative network and the liveness detection model may be obtained by inputting the training set into the initial generative network and a neural network model. The training set may be, for example, represented as:

$$D = \{(x_L^1, x_R^1, b^1, y), (x_L^2, x_R^2, b^2, y), (x_L^3, x_R^3, b^3 y), \ldots (x_l^n, x_r^n, b^n, y)\}$$

Here, $x_l$ is the first sample image collected by the first sensor; and $x_r$ is the second sample image collected by the second sensor. The resolution of the two images may be 112×112×3; as the two images act as inputs of a network, b is the initial depth information obtained through the stereo matching algorithm; and the resolution of the initial depth information may be set to 56×56×1. Herein, b may be used as a depth label; and y is a classification label for both true and false categories, which is used for indicating whether the face sample included in the corresponding training data is live or spoofing (exemplarily, the classification label for "true" may be "1", indicating a living body; and the classification label for "false" may be "0", indicating a spoofing face), where n is the amount of training data in the training set.

It can be understood that in some typical implementations, the first sensor and the second sensor may jointly belong to a binocular stereo vision sensor. The first sensor may be a left-eye sensor of the binocular stereo vision sensor; and the second sensor may be a right-eye sensor of the binocular stereo vision sensor.

At S1020, the first sample images and the second sample images are inputted into the initial generative network, and the initial depth information is used as supervised learning information to train the initial generative network, so as to obtain the deep generative network, thereby causing the difference between the depth information, which is extracted from the first sample images and the second sample images by using the deep generative network, and the initial depth information to meet a preset difference condition.

In some implementations, the initial generative network may be trained by using the first sample image and the second sample image in each copy of training data in the training set.

In the embodiment of the present disclosure, the initial depth information may be used as the supervised learning information to train the initial generative network. In some implementations, a loss function may be built in the initial generative network to represent the difference between the depth information, which is extracted from the first sample image and the second sample image by the deep generative network, and the initial depth information. By continuously adjusting network parameters of the initial generative network, and calculating the loss function again after each preset number of adjustments, when the loss function meets a preset condition (for example, the value of the loss function is greater than a preset difference threshold), the current initial generative network may be determined as the deep generative network.

Specifically, two groups of loss functions may be built for the initial generative network. One group of the loss functions is cross entropy of the difference between the depth information $\hat{B}_i$ and the initial depth information $B_i$ (i.e., the depth label b in the training set), which is shown as L1NNB; and the other group of the loss functions is a relative depth loss, and is defined to be shown as L2NNB. Here, i is used for representing the serial number of each copy of training data in the training set.

$$L1_{NNB} = \sum_{(X_L X_R B) \in D} \frac{1}{N} \sum_i \left( B_i \log_2(\hat{B}_i) + (1 - B_i) \log_2(1 - \hat{B}_i) \right)$$

$$L2_{NNB} = \sum_i \left\| K_i^{contrast} \otimes \hat{B} - K_i^{contrast} \otimes B \right\|_2^2$$

Here, $K^{contrast}$ is a group of convolution kernels, and for example, may be defined as:

$$K_j^{contrast} = \begin{bmatrix} 1 & 0 & 0 \\ 0 & -1 & 0 \\ 0 & 0 & 0 \end{bmatrix}_{j=1,} \begin{bmatrix} 0 & 1 & 0 \\ 0 & -1 & 0 \\ 0 & 0 & 0 \end{bmatrix}_{j=2,} \begin{bmatrix} 0 & 0 & 1 \\ 0 & -1 & 0 \\ 0 & 0 & 0 \end{bmatrix}_{j=3,} \begin{bmatrix} 0 & 0 & 0 \\ 1 & -1 & 0 \\ 0 & 0 & 0 \end{bmatrix}_{j=4,}$$

$$\begin{bmatrix} 0 & 0 & 0 \\ 0 & -1 & 1 \\ 0 & 0 & 0 \end{bmatrix}_{j=5,} \begin{bmatrix} 0 & 0 & 0 \\ 0 & -1 & 0 \\ 1 & 0 & 0 \end{bmatrix}_{j=6,} \begin{bmatrix} 0 & 0 & 0 \\ 0 & -1 & 0 \\ 0 & 1 & 0 \end{bmatrix}_{j=7,} \begin{bmatrix} 0 & 0 & 0 \\ 0 & -1 & 0 \\ 0 & 0 & 1 \end{bmatrix}_{j=8}$$

Here, $\otimes$ is a deep separable convolution, and j is position information of a number 1 around −1 in a matrix. When the relative depth loss is calculated, the depth label and the depth information first need to be expanded to 8 channels by a broadcast mechanism of tensor. The relative depth loss is intended to understand the pattern of how each pixel is formed, so as to constrain the contrast ratio between the current pixel and a neighboring pixel.

Therefore, by using the initial depth information as the supervised learning information to train the deep generative network, the depth information obtained by the deep generative network may reflect true features of the face sample more accurately, thereby obtaining an accurate and reliable detection result when face liveness detection is performed. In addition, under an actual liveness detection scenario, the manner of extracting the target depth information by the deep generative network is used to replace the manner of calculating the initial depth information by the stereo matching algorithm, such that consumption of calculation resources may be greatly reduced, calculation time is shortened, detection efficiency is effectively improved, and real-time liveness detection is improved.

At S930, depth information of the face samples is extracted from the first sample images and the second sample images by using the deep generative network.

In some implementations, the training process of the deep generative network and the training process of the liveness detection model may be performed synchronously. That is to say, the training of the deep generative network and the training of a liveness detection network may be synchronously performed by using the training data in the training set.

Therefore, in some embodiments, after the network parameters of the initial generative network are adjusted each time, the depth information may be extracted from the first sample image and the second sample image by using the current initial generative network, and the depth information is inputted into the neural network model, so as to train the neural network model. That is to say, a training iteration process of the initial generative network and a training iteration process of the neural network model may be nested together, and converge together. It is to be understood that, the current initial generative network may not achieve a training target, such that the depth information may not the optimal depth information, and there is still a large difference from the initial depth information. In this case, the depth information generated during each adjustment may be inputted into the pre-built neural network model for training. After two training iteration processes are completed, the current initial generative network and the neural network model are determined as the deep generative network and the liveness detection model.

At S940, the depth information of the face sample is inputted into the neural network model to train the neural network model, so as to obtain the liveness detection model.

Specifically, the depth information may be detected in the neural network model, so as to obtain the liveness detection result of the face sample. Optionally, the detection result may be compared with a pre-labeled target label for the face sample, and the neural network model is trained by using a comparison result, so as to cause the detection difference between the detection result, which is obtained by the liveness detection model, and the target label to meet a preset detection condition.

Figure 12:
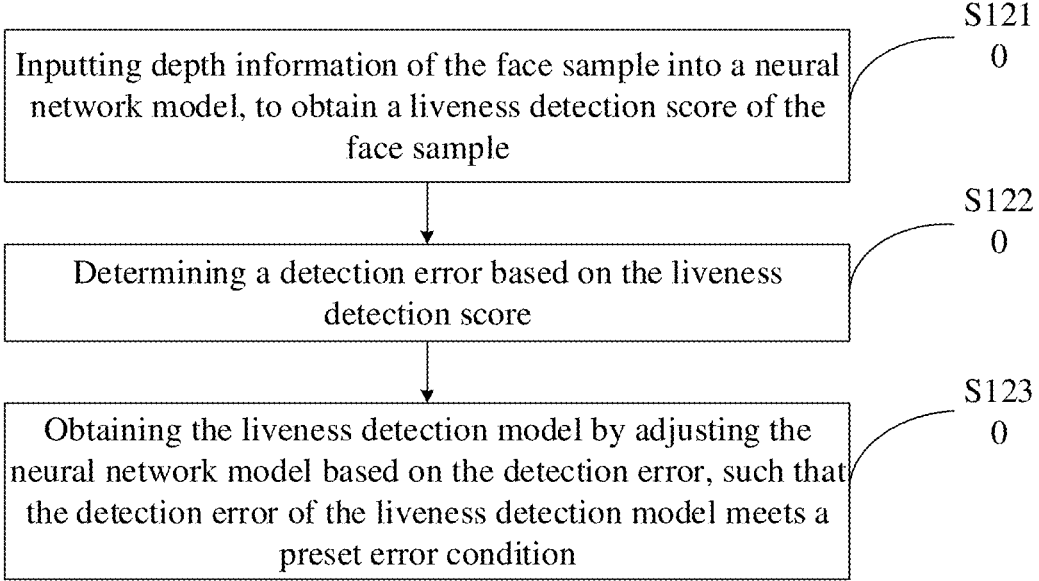
FIG. 12 is a flowchart of a training process of a liveness detection model in a liveness detection system according to an embodiment of the present disclosure.

In some implementations of the present disclosure, as shown in FIG. 12, the specific training process of inputting the depth information into the neural network model for training, so as to obtain the liveness detection model may include the following steps.

At S1210, the depth information of the face sample is inputted into the neural network model, so as to obtain a liveness detection score of the face sample.

The liveness detection score is the probability that the neural network model determines a classification label of the face sample as the pre-labeled target label.

In the neural network model in the embodiment, the face sample may be scored based on the depth information. The liveness detection score of the face sample may be obtained through scoring. Since the classification label may be labeled on each face sample in the training set, during training, the liveness detection score may be the probability that the classification label (i.e., the target label) of the face sample is determined as the pre-labeled classification label according to the depth information. Exemplarily, the liveness detection score may be obtained by calculating the similarity between the depth information and the depth feature represented by the pre-labeled classification label.

For example, for some sample data in the training set, if the target label pre-labeled by the face sample included in the sample data is the classification label representing a living body (for example, the classification label y in the sample data is "1"), the liveness detection score of the face sample is the probability obtained in the neural network model that the face sample is determined to be live. In this case, the liveness detection score may be, for example, obtained by normalizing, by using a softmax model, the similarity between the depth information and the living body feature.

At S1220, a detection error is determined based on the liveness detection score.

In the embodiment of the present disclosure, after the liveness detection score of the face sample is obtained, the classification label, which is obtained by performing binary classification on the face sample by the neural network model, may be outputted based on the liveness detection score. Further, a detection error between the classification label and the pre-labeled target label may be calculated.

At S1230, the neural network model is adjusted based on the detection error, to obtain the liveness detection model, so as to cause the detection error of the liveness detection model to meet a preset error condition.

Optionally, the liveness detection score corresponding to the detection error meeting the preset error condition may also be determined as a preset detection threshold.

Further, a loss function of liveness detection may be built according to the classification label outputted by the neural network model and the pre-labeled target label. Specifically, the loss function LNNC of liveness detection may be defined by using FocalLoss, and LNNC may be, for example, represented as $$L_{NNC} = \sum_{\{X_L, X_R, y\} \in D} \frac{1}{N} \sum_i a_t \left( Y_i \log_2(\hat{Y}_i) + (1 - Y)^\gamma \log_2(1 - \hat{Y}_i) \right)$$

Here, $a_t$ is a self-defined parameter; $\hat{Y}_i$ is a classification label, which is outputted by the neural network model for the face sample included in ith sample data; and $Y_i$ is a target label in the ith sample data. By using the loss function LNNC of liveness detection, the detection error, which is obtained by performing liveness detection on the training set by the neural network model, may be calculated.

Exemplarily, the neural network model of which loss function of liveness detection meets the preset condition (for example, the detection error represented by the loss function is less than the preset error threshold) may be finally obtained by continuously adjusting model parameters of the neural network model, and calculating the loss function of liveness detection again after each preset number of adjustments, and then the current neural network model may be used as the liveness detection model. In addition, the liveness detection score corresponding to the detection error meeting the present condition may also be determined as the preset detection threshold.

In some typical embodiments, the classification label obtained through output of the neural network model may be, for example, represented as $\hat{Y}=NNC(\hat{B})$, where NNC($\cdot$) may represent an output of the neural network model. The pre-built neural network model may be an NNC network consisting of a bottleneck layer, a downsampling layer, a stream module, and a fully connected layer. The depth information may be shown in the form of a pseudo depth map, and the downsampling layer may sample the resolution of the pseudo depth map to the size of 7×7. In addition, the fully connected layer may consist of 2 neurons and a softmax activation function. Next, the NNC network is then trained by using the pseudo depth map. After the pseudo depth map is inputted into the NNC network, the NNC network performs binary classification on the face sample according to the pseudo depth map, respectively calculates scores of a living body label and a spoofing label, and then uses the loss function LNNC of liveness detection to calculate the error between a predicted classification label and a real classification label. The NNC network is optimized by adjusting model parameters of all layers in the NNC network, classification errors are reduced, such that the accuracy of liveness detection is improved.

Optionally, all convolutions in the neural network model may also be replaced by using a center difference convolution.

In some implementations, the training process of the deep generative network and the training process of the liveness detection model may be performed synchronously. That is to say, a target function may be uniformly used to represent the difference between the depth information outputted by the initial generative network and the initial depth information, and the detection error of the neural network model. Exemplarily, the target function may be represented as LOSS=L1$_{NNB}$+L2$_{NNB}$+L$_{NNC}$.

Therefore, during training, by continuously adjusting the network parameters of the initial generative network and the model parameters of the neural network model, and calculating the target function again after the preset number of adjustments, the deep generative network and a liveness detection network that enable the target function meets a preset condition (for example, less than a target threshold) may be finally obtained.

Therefore, by using the depth information to calculate the liveness detection score of the face sample, and then using the liveness detection score to determine the detection error of the neural network model, the liveness detection model of which detection error meets the preset error condition may be obtained by continuously adjusting the model parameters of the neural network model. In addition, during the adjustment of the model parameters, the preset detection threshold of the liveness detection model may also be obtained, such that when liveness detection is performed on the to-be-recognized face by using the liveness detection model, once it is determined that the target detection score meets the preset condition (for example, greater than the detection threshold), it is determined that the to-be-recognized face is live, and at the same time, the detection error may also be constrained within a rational range, so as to achieve the purpose of improving the accuracy of liveness detection.

Figure 13:
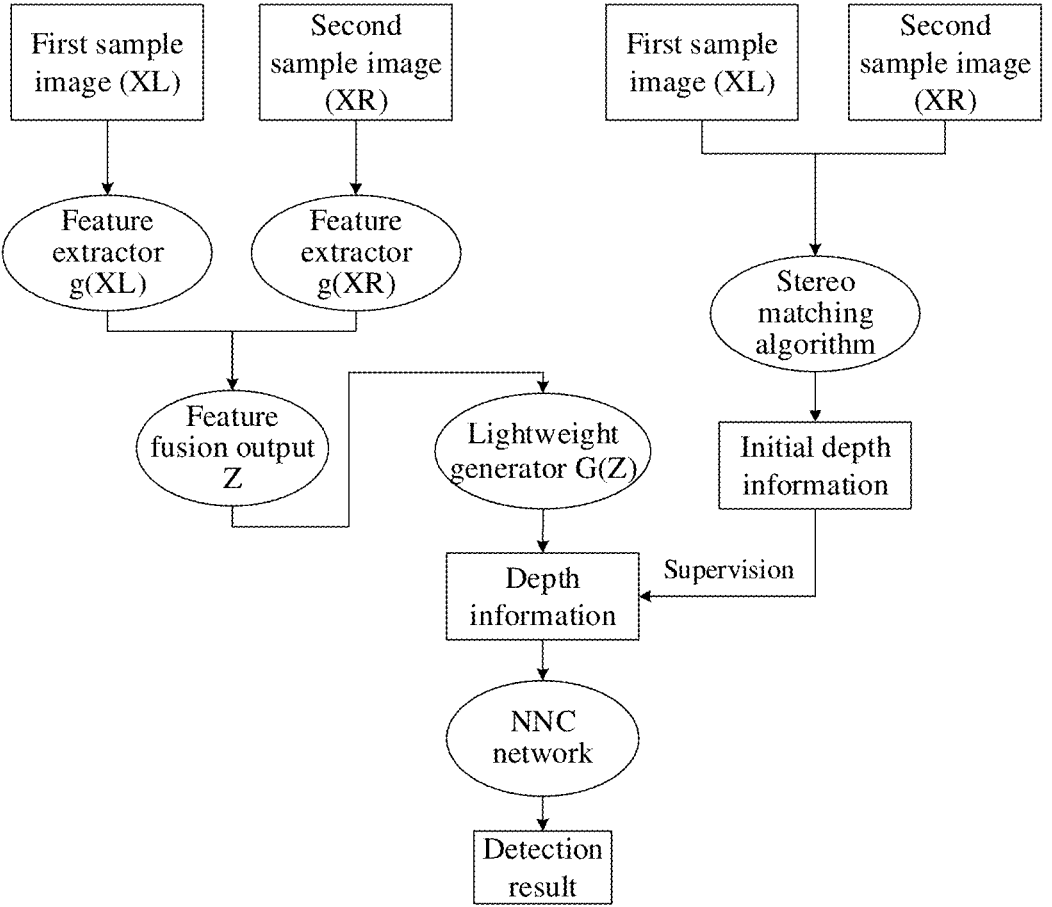
FIG. 13 is a schematic diagram of a processing process of a training apparatus for a liveness detection system according to an embodiment of the present disclosure.

Optionally, FIG. 13 is a flowchart of a model training process in a liveness detection method according to an embodiment of the present disclosure.

In some typical implementations of the present disclosure, the first sample image (XL) and the second sample image (XR), which are obtained by performing collection on the face sample by the first sensor and the second sensor, may be respectively inputted into F-CDCN network shallow feature extractors with the same structure for feature extraction. The feature extractors may combine FeatherNet with functions of a center difference convolution module, and two feature maps g(XL) and g(XR) may be obtained through processing such as downsampling. Next, in the step of feature fusion, image fusion may be performed on the two feature maps g(XL) and g(XR) by using feature stacking, so as to obtain a sample fusion image Z.

Further, the sample fusion image Z may be inputted into a lightweight generator. In the lightweight generator, under supervision of the initial depth information, the depth information may be generated by using bilinear upsampling and a Sigmoid activation function. It is to be noted that, the initial depth information may be the distance, which is obtained by calculating the first sample image (XL) and the second sample image (XR) by using the stereo matching algorithm, between the first sensor and the second sensor and the face sample.

Optionally, the depth information may be shown in the form of the pseudo depth map, and the initial depth information may be shown in the form of a depth map. The resolution of the pseudo depth map is the same as the resolution of the depth map, and may be, for example, 56×56×1.

Further, by inputting the depth information into the NNC network, the face samples may be classified in the NNC network by using the depth information. In order to control errors outputted by the lightweight generator and the NNC network, two groups of loss functions L1NNB and L2NNB may be built in the lightweight generator, and a group of loss functions LNNC is built in the NNC network.

In some implementations, the target function may be uniformly used to represent the errors, which are generated during overall training of the liveness detection system; and the target function may be, for example, represented as LOSS=L1$_{NNB}$+L2$_{NNB}$+L$_{NNC}$. By continuously adjusting network parameters of the lightweight generator and model parameters of the NNC network, and calculating the value of the target function at each adjustment, the lightweight generator and the NNC network with small errors may be finally obtained.

In the embodiment of the present disclosure, four algorithm modules of a feature extractor, feature fusion, the lightweight generator and the NNC network are trained by using the face images, which are collected by the first sensor and the second sensor in different lighting environments, and the depth information obtained by the stereo matching algorithm is used as supervision, such that problems of occlusion regions and color styles during the process of replacing a real face with a spoofing face, and eyebrow ghosting during replacement may be solved.

Optionally, in some typical implementations, the first sensor and the second sensor may jointly form a binocular stereo vision sensor.

It can be understood that a specific process of training the four algorithm modules of the feature extractor, the feature fusion, the lightweight generator and the NNC network by using the first sample images and the second sample images may refer to corresponding processes in the foregoing embodiments, and is not described herein again.

Figure 14:
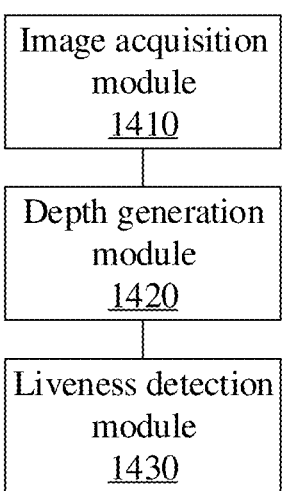
FIG. 14 is a block diagram of modules of a liveness detection apparatus according to an embodiment of the present disclosure.

FIG. 14 is a block diagram of modules of a liveness detection apparatus according to an embodiment of the present disclosure. Specifically, the apparatus may include an image acquisition module 1410, a depth generation module 1420, and a liveness detection module 1430.

The image acquisition module 1410 is configured to acquire a first target image, which is obtained by performing collection on the to-be-recognized face by a first sensor, and acquire a second target image which is collected by a second sensor for the face. The depth generation module 1420 is configured to extract target depth information from the first target image and the second target image by using a pre-trained deep generative network. The liveness detection module 1430 is configured to detect the target depth information by using a pre-trained liveness detection model, so as to obtain a liveness detection result of the to-be-recognized face.

Optionally, the liveness detection model may be obtained by using training using the depth information extracted from sample data. The sample data may include first sample images collected by the first sensor, and second sample images collected by the second sensor in at least two lighting environments. The first sample images and the second sample images all include spoofing faces of different materials.

In some implementations, the liveness detection module 1430 may include: a score calculation module, configured to input the target depth information into the liveness detection model, so as to a target detection score that the to-be-recognized face is detected to be live; and a score determination module, configured to determine the to-be-recognized face to be live when the target detection score meets a preset detection threshold.

Optionally, in some embodiments, the depth generation module 1420 may include: an image fusion module, configured to fuse the first target image and the second target image, so as to obtain a target fusion image; and a depth generation sub-module, configured to input the target fusion image into the deep generative network, and process the target fusion image in the deep generative network, so as to obtain the target depth information.

Optionally, in some embodiments, the image fusion module may further be configured to scale down the first target image and the second target image in equal proportion, and fuse the two scaled-down images.

Figure 15:
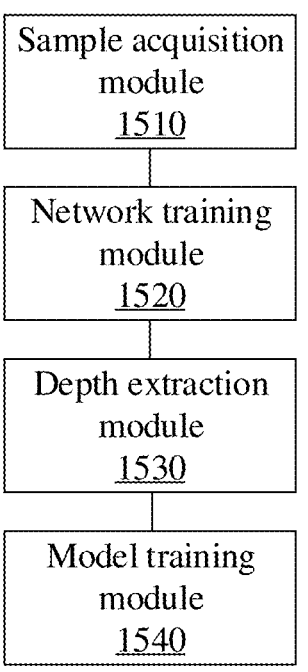
FIG. 15 is a block diagram of modules of a training apparatus for a liveness detection system according to an embodiment of the present disclosure.

FIG. 15 is a block diagram of modules of a training apparatus for a liveness detection system according to an embodiment of the present disclosure. Herein, the liveness detection system may include the deep generative network and the liveness detection model. Specifically, the apparatus may include a sample acquisition module 1510, a network training module 1520, a depth extraction module 1530, and a model training module 1540.

The sample acquisition module 1510 is configured to acquire first sample images collected by a first sensor for face samples, and second sample images collected by a second sensor for the face samples in at least two lighting environments, where the face samples include spoofing faces of different materials. The network training module 1520 is configured to input the first sample images and the second sample images into an initial generative network to train the initial generative network, so as to obtain the deep generative network. The depth extraction module 1530 is configured to extract depth information of the face samples from the first sample images and the second sample images by using the deep generative network. The model training module 1540 is configured to input the depth information into a pre-built neural network model to train the neural network model, so as to obtain the liveness detection model.

Further, based on the above embodiments, the network training module 1520 may include: a stereo matching module, configured to perform calculation by using a stereo matching algorithm according to the first sample images and the second sample images, so as to obtain initial depth information; and a supervision module, configured to input the first sample images and the second sample images into the initial generative network, and use the initial depth information as supervised learning information to train the initial generative network, so as to obtain the deep generative network, thereby causing the difference between the depth information, which is extracted from the first sample images and the second sample images by using the deep generative network, and the initial depth information to meet a preset difference condition.

Optionally, based on the above embodiments, the network training module 1520 may further include: a sample fusion module, configured to fuse the first sample images and the second sample images, so as to obtain sample fusion images; and a network training sub-module, configured to input the sample fusion images into the initial generative network for training, so as to obtain the deep generative network.

Optionally, in some embodiments, the sample fusion module may further be configured to scale down the first sample images and the second sample images in equal proportion, and fuse the scaled-down first sample images and second sample images.

In some implementations, the model training module 1540 may include: a sample score calculation module, configured to input the depth information into the neural network model, so as to obtain liveness detection scores of the face samples, where the liveness detection score is the probability that a classification label of the face sample is determined as a pre-labeled target label; and an error determination module, configured to determine a detection error based on the liveness detection scores, and adjust the neural network model based on the detection error, to obtain the liveness detection model, so as to cause the detection error of the liveness detection model to meet a preset error condition.

Optionally, the model training module 1540 may further include: a model training sub-module, configured to determine, as a preset detection threshold, the liveness detection score corresponding to the detection error meeting the preset error condition.

In some typical implementations, the first sensor and the second sensor jointly form a binocular stereo vision sensor.

Those skilled in the art may clearly learn about that specific working processes and technical effects of the modules/units/sub-units/components in the apparatus described above may refer to the corresponding processes and descriptions in the above method embodiments and are not elaborated herein again for ease and briefness of description.

In several embodiments provided in the present disclosure, the displayed or discussed coupling or direct coupling or communication connection between the modules may be indirect coupling or communication connection through some interfaces, apparatuses or modules, and may be in electrical, mechanical or other forms.

In addition, each function module in each embodiment of the present disclosure may be integrated into a processing module, or each module may also physically exist independently, or two or more than two modules may also be integrated into a module. The above integrated module may be implemented in a form of hardware, or may be implemented in a form of a software functional module.

Figure 16:
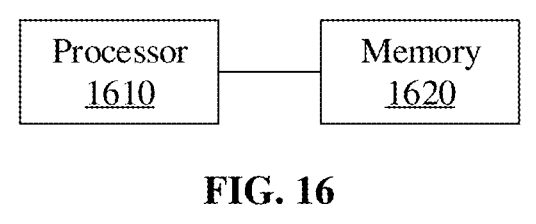

FIG. 16 is a block diagram of a structure of an electronic device according to an embodiment of the present disclosure. The electronic device in the embodiment may include one or more of the following components: a processor 1610, a memory 1620, and one or more application programs. The one or more application programs may be stored in the memory 1620 and configured to be executed by one or more processors 1610; and the one or more application programs are configured to execute the method described in the above method embodiments.

The electronic device may be any one of various types of mobile and portable computer systems for executing wireless communication. Specifically, the electronic device may be a mobile phone or a smart phone (for example, phones based on iPhone™ and Android™), a portable gaming device (for example, Nintendo DS™, PlayStation Portable™, Gameboy Advance™, and iPhone™), a laptop computer, a Personal Digital Assistant (PDA), a portable Internet device, a music player and a data storage device, other hand-held devices, and a smart watch, a smart bracelet, headphones, a pendant, and the like. The electronic device may also be other wearable device (for example, electronic glasses, electronic clothing, electronic bracelets, electronic necklaces, electronic tattoos, electronic devices or Helmet-Mounted Displays (HMD)).

The electronic device may also be any one of a plurality of electronic devices. The plurality of electronic devices include, but are not limited to, cellular telephones, smart phones, smart watches, smart bracelets, other wireless communication devices, PDAs, audio players, other media players, music recorders, video recorders, cameras, other media recorders, radios, medical devices, vehicular transportation instruments, calculators, programmable remote controls, pagers, laptop computers, desktop computers, printers, netbook computers, PDAs, Portable Multimedia Players (PMPs), Motion Picture Experts Group (MPEG-1 or MPEG-2) Audio Layer 3 (MP3) players, portable medical devices, and digital cameras, and combinations thereof.

In some cases, the electronic device may execute various functions (for example, playing music, displaying videos, storing pictures, and receiving and sending telephone calls). If needed, the electronic device may be, for example, a cellular telephone, a media player, other hand-held device, a wristwatch device, a pendant device, an earphone device, or other compact portable device.

Optionally, the electronic device may be a server, for example, may be an independent physical server, may also be a server cluster formed by a plurality of physical servers or a distributed system, may be a cloud server configured to provide basic cloud computing services such as a cloud service, a cloud database, cloud computing, a cloud function, cloud storage, a network service, cloud communication, a middleware service, a domain name service, a security service, a Content Delivery Network (CDN), and cloud servers of basic cloud calculation services such as a big data and artificial intelligence platform, and may also be a specialized or platform server providing facial recognition, automated driving, industrial Internet services, data communication (for example, 4G and 5G).

The processor 1610 may include one or more processing cores. The processor 1610 is connected to each part in the entire electronic device by using various interfaces and lines, and executes various functions and processing data of the electronic device by running or executing an instruction, an application program, a code set or an instruction set, which are stored in the memory 1620, and calling data stored in the memory 1620. Optionally, the processor 1610 may be implemented by using at least one hardware form of Digital Signal Processing (DSP), Field-Programmable Gate Array (FPGA), or Programmable Logic Array (PLA). The processor 1610 may be integrated with a combination of one or several of a Central Processing Unit (CPU), a Graphics Processing Unit (GPU), and a modem. The CPU mainly processes an operating system, a user interface, and an application program; the GPU is configured to be responsible for the rendering and drawing of display content; and the modem is configured to process a wireless communication. It can be understood that the above modem may also not be integrated into the processor 1610, but is implemented by a single communication chip.

The memory 1620 may include a Random Access Memory (RAM), and may also include a Read-Only Memory (ROM). The memory 1620 may be configured to store an instruction, an application program, a code, a code set or an instruction set. The memory 1620 may include a program storage area and a data storage area. The program storage area may store an instruction for implementing an operating system, an instruction for implementing at least one function (for example, a touch-control function, a sound playing function, an image playback function, and the like), and an instruction for implementing the following method embodiments. The data storage area may store data (for example, phone books, audio and video data, chat record data) created during the using of the electronic device.

Those skilled in the art may clearly learn about that specific working processes of the processor 1610 and the memory 1620 of the electronic device described above may refer to the corresponding processes in the above method embodiments and will not be elaborated herein for ease and briefness of description.

Figure 17:
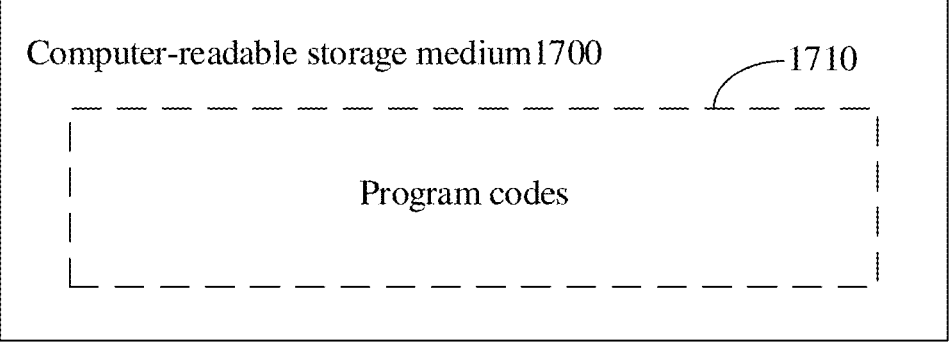
FIG. 17 is a block diagram of a structure of a computer-readable storage medium according to an embodiment of the present disclosure.

FIG. 17 is a block diagram of a structure of a computer-readable storage medium according to an embodiment of the present disclosure. The computer-readable storage medium 1700 stores a program code; and the program code may be called by the processor to execute the method described in the above method embodiments.

The computer-readable storage medium 1700 may be an electronic memory such as a flash memory, an Electrically Erasable Programmable Read-Only Memory (EEPROM), an Erasable Programmable Read-Only Memory (EPROM), a hard disk, or an ROM. Optionally, the computer-readable storage medium 1700 includes a non-transitory computer-readable storage medium. The computer-readable storage medium 1700 is provided with a memory space of a program code 1710 for executing any method steps in the above method. These program codes may be read from one or more computer program products or written into the one or more computer program products. The program code 1710 may be, for example, compressed in an appropriate form. The computer-readable storage medium 1700 may be, for example, an ROM, an RAM, an SSD, an EEPROM, or a flash memory (or flash for short).

In some embodiments, a computer program product or a computer program is provided. The computer program product or the computer program includes a computer instruction. The computer instruction is stored in a computer-readable storage medium. A processor of a computer device reads the computer instruction from the computer-readable storage medium; and the processor executes the computer instruction, so as to enable the computer device to execute steps in the above method embodiments.

It is to be noted that terms "include" and "comprise" or any other variant thereof is intended to cover nonexclusive inclusions herein, so that a process, method, object or apparatus including a series of components not only includes those components but also includes other components which are not clearly listed or further includes components intrinsic to the process, the method, the object or the apparatus. Under the condition of no more limitations, a component defined by the statement "including a/an . . . " does not exclude existence of the same other components in a process, method, object or apparatus including the component.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, an ROM/RAM, an SSD and a Flash), a magnetic disk and an optical disk), including a plurality of instructions configured to enable a terminal device (which may be a mobile phone, a computer, a server, an air-conditioner, a network device, or the like) to execute the method in each embodiment of the present disclosure.

The present disclosure provides the liveness detection method and apparatus, and the electronic device and the storage medium. Specifically, in the present disclosure, the first target image, which is obtained by performing collection on the to-be-recognized face by the first sensor, and the second target image, which is obtained by performing collection on the same the to-be-recognized face by the second sensor, may be acquired; the target depth information is extracted from the first target image and the second target image by using the pre-trained deep generative network; and then the target depth information is detected by using the pre-trained liveness detection model, so as to obtain the liveness detection result of the to-be-recognized face. The liveness detection model is obtained by using training using the depth information extracted from the sample data, the sample data includes the first sample images collected by the first sensor, and the second sample images collected by the second sensor, under the at least two lighting environments, and the first sample images and the second sample images all include spoofing faces of different materials. Based on this, in the present disclosure, the target depth information is extracted, by using the deep generative network, from the two images collected by the first sensor and the second sensor, and then the target depth information is detected by using the liveness detection model, so as to obtain the liveness detection result, such that consumption of calculation resources may be greatly reduced, calculation time is shortened, detection efficiency is effectively improved, and real-time liveness detection is significantly improved. Therefore, the method is particularly suitable for actual liveness detection scenarios. In addition, according to the liveness detection method provided in the present disclosure, spoofing faces of different materials in different lighting environments may be recognized, such that the accuracy of liveness detection is higher.

It is to be noted at last: the above various embodiments are only used to illustrate the technical solutions of the present disclosure and not used to limit the same. Although this disclosure has been described in detail with reference to the foregoing embodiments, for those of ordinary skill in the art, they can still modify the technical solutions described in the foregoing embodiments, or equivalently replace part of the technical features; all these modifications and replacements shall not cause the essence of the corresponding technical solutions to depart from the spirit and the scope of the technical solutions of the embodiments of the present disclosure.

The invention claimed is:

1. A liveness detection method, comprising:
acquiring a first target image which is collected by a first sensor for a to-be-recognized face, and acquiring a second target image which is collected by a second sensor for the to-be-recognized face;
extracting target depth information from the first target image and the second target image by using a pre-trained deep generative network; and
obtaining a liveness detection result of the to-be-recognized face by detecting the target depth information by using a pre-trained liveness detection model, wherein the liveness detection model is obtained by training using depth information extracted from sample data, the sample data comprises first sample images collected by the first sensor, and second sample images collected by the second sensor in at least two lighting environments, and the first sample images and the second sample images all comprise spoofing faces of different materials;
wherein the method further comprises: training an initial generative network by inputting the first sample images and the second sample images into the initial generative network, to obtain the deep generative network, comprising: performing calculation by using a stereo matching algorithm based on the first sample images and the second sample images, to obtain initial depth information; and training the initial generative network by inputting the first sample images and the second sample images into the initial generative network and by using the initial depth information as supervised learning information, to obtain the deep generative network such that a difference between the depth information, which is extracted from the first sample images and the second sample images by using the deep generative network, and the initial depth information meets a preset difference condition;

extracting the depth information from the first sample images and the second sample images by using the deep generative network; and training a neural network model by inputting the depth information into the neural network model, to obtain the liveness detection model.

2. The liveness detection method of claim 1, wherein extracting the target depth information from the first target image and the second target image by using the pre-trained deep generative network comprises:

obtaining a target fusion image by fusing the first target image and the second target image; and inputting the target fusion image into the deep generative network, and obtaining the target depth information by processing the target fusion image in the deep generative network.

3. The liveness detection method of claim 2, wherein obtaining the target fusion image by fusing the first target image and the second target image comprises:

scaling down the first target image and the second target image in equal proportion, and obtaining the target fusion image by performing fusion on the first target image and the second target image that have been scaled down.

4. The liveness detection method of claim 1, wherein the first sensor and the second sensor are a left-eye sensor and a right-eye sensor on a binocular stereo vision sensor respectively.

5. The liveness detection method of claim 1, wherein the first target image and the second target image both are visible light images.

6. The liveness detection method of claim 1, wherein training the initial generative network by inputting the first sample images and the second sample images into the initial generative network, to obtain the deep generative network further comprises:

scaling down the first sample images and the second sample images in equal proportion, and obtain sample fusion images by performing fusion on the first sample images and the second sample images that have been scaled down; and training the initial generative network by inputting the sample fusion images into the initial generative network, to obtain the deep generative network.

7. The liveness detection method of claim 1, wherein training the neural network model by inputting the depth information into the neural network model, to obtain the liveness detection model further comprises:

inputting the depth information into the neural network model to obtain a liveness detection score of a face sample, wherein the liveness detection score is a probability that the neural network model determines a classification label of the face sample as a pre-labeled target label;

determining a detection error based on the liveness detection score; and adjusting the neural network model based on the detection error to obtain the liveness detection model, such that the detection error of the liveness detection model meets a preset error condition.

8. A training method for a liveness detection system, wherein the liveness detection system comprises a deep generative network and a liveness detection model; and the training method comprises:

acquiring first sample images collected by a first sensor for face samples, and second sample images collected by a second sensor for the face samples in at least two lighting environments, wherein the face samples comprise spoofing faces of different materials;

training the initial generative network by inputting the first sample images and the second sample images into an initial generative network, to obtain the deep generative network, comprising: obtaining initial depth information by calculation using a stereo matching algorithm based on the first sample images and the second sample images; and training the initial generative network by inputting the first sample images and the second sample images into the initial generative network and by using the initial depth information as supervised learning information, to obtain the deep generative network, such that a difference between the depth information, which is extracted from the first sample images and the second sample images by using the deep generative network, and the initial depth information meets a preset difference condition;

extracting depth information of the face samples from the first sample images and the second sample images by using the deep generative network; and training the neural network model by inputting the depth information of the face samples into a neural network model, to obtain the liveness detection model.

9. The training method of claim 8, wherein the first sample images and the second sample images are all visible light images.

10. The training method of claim 8, wherein training the initial generative network by inputting the first sample images and the second sample images into the initial generative network, to obtain the deep generative network comprises:

obtaining sample fusion images by fusing the first sample images and the second sample images; and training the initial generative network by inputting the sample fusion images into the initial generative network, to obtain the deep generative network.

11. The training method of claim 10, wherein obtaining the sample fusion images by fusing the first sample images and the second sample images comprises:

scaling down the first sample images and the second sample images in equal proportion, and obtaining the sample fusion images by performing fusion on the first sample images and the second sample images that have been scaled down.

12. The training method of claim 8, wherein training the neural network model by inputting the depth information of the face samples into the neural network model, to obtain the liveness detection model further comprises:

inputting the depth information of the face samples into the neural network model to obtain liveness detection scores of the face samples, wherein the liveness detection score is a probability that the neural network model determines a classification label of the face sample as a pre-labeled target label;

determining a detection error based on the liveness detection score; and adjusting the neural network model based on the detection error, and when the detection error meets a preset error condition, determining the current neural network model as the liveness detection model.

13. A liveness detection apparatus, comprising:

one or more processors; and a memory for storing instructions;

wherein the one or more processors are configured to execute the instructions in the memory to perform operations of:

acquiring a first target image which is collected by a first sensor for a to-be-recognized face, and acquiring a second target image which is collected by a second sensor for the to-be-recognized face;

extracting target depth information from the first target image and the second target image by using a pre-trained deep generative network; and detecting the target depth information by using a pre-trained liveness detection model, to obtain a liveness detection result of the to-be-recognized face, wherein the liveness detection model is obtained by training using depth information extracted from sample data, the sample data comprises first sample images collected by the first sensor, and second sample images collected by the second sensor in at least two lighting environments, and the first sample images and the second sample images all comprise spoofing faces of different materials;

the one or more processors are further configured to execute the instructions in the memory to perform operations of:

training an initial generative network by inputting the first sample images and the second sample images into the initial generative network, to obtain the deep generative network, comprising: performing calculation by using a stereo matching algorithm based on the first sample images and the second sample images, to obtain initial depth information; and training the initial generative network by inputting the first sample images and the second sample images into the initial generative network and by using the initial depth information as supervised learning information, to obtain the deep generative network such that a difference between the depth information, which is extracted from the first sample images and the second sample images by using the deep generative network, and the initial depth information meets a preset difference condition;

extracting the depth information from the first sample images and the second sample images by using the deep generative network; and training a neural network model by inputting the depth information into the neural network model, to obtain the liveness detection model.

14. The liveness detection apparatus of claim 13, wherein extracting the target depth information from the first target image and the second target image by using the pre-trained deep generative network comprises:

obtaining a target fusion image by fusing the first target image and the second target image; and inputting the target fusion image into the deep generative network, and obtaining the target depth information by processing the target fusion image in the deep generative network.

15. The liveness detection apparatus of claim 14, wherein obtaining the target fusion image by fusing the first target image and the second target image comprises:

scaling down the first target image and the second target image in equal proportion, and obtaining the target fusion image by performing fusion on the first target image and the second target image that have been scaled down.

* * * * *